United States Patent [19]

Fluri

[11] Patent Number: 4,947,714
[45] Date of Patent: Aug. 14, 1990

[54] LOW-NOISE SCREWING TOOL COUPLING

[75] Inventor: Martin Fluri, Luterbach, Switzerland

[73] Assignee: Scintilla Aktiengesellschaft, Solothurn, Switzerland

[21] Appl. No.: 272,542

[22] Filed: Nov. 16, 1988

[30] Foreign Application Priority Data

Sep. 21, 1988 [DE] Fed. Rep. of Germany ....... 3831960

[51] Int. Cl.$^5$ ............................................. B25B 23/157
[52] U.S. Cl. ....................................................... 81/475
[58] Field of Search ........................ 81/467, 473–476; 173/12; 192/56 R, 150

[56] References Cited

U.S. PATENT DOCUMENTS

| | | | |
|---|---|---|---|
| 2,634,640 | 4/1953 | Pedersen | 81/475 |
| 2,724,299 | 11/1955 | Amtsberg | 81/475 |
| 4,655,103 | 4/1987 | Schreiber et al. | 81/474 |

Primary Examiner—D. S. Meislin
Attorney, Agent, or Firm—Michael J. Striker

[57] ABSTRACT

A coupling for a motor operated screwing tool contains three coupling elements of which one is provided on an output shaft, another one on a drive shaft, and a intermediate, one of which is constructed as a coupling ring (8) which is longitudinally displaceable on the output shaft, whereby a spring (4) is arranged between the drive shaft and the coupling ring urges the latter into engagement with the coupling element on the output shaft. A disengagement without rattling and with low wear is achieved after reaching the limiting torque by means of sloping surfaces (2, 116) at the longitudinally displaceable coupling ring (8) and the output shaft, which sloping surfaces (2, 116) cooperate with the spring (4) and an adjustable depth stop on a tool housing (23), and wherein the movement of the coupling ring (8) is defined by means of two shoulders (10, 11) arranged on the output shaft (6).

6 Claims, 4 Drawing Sheets

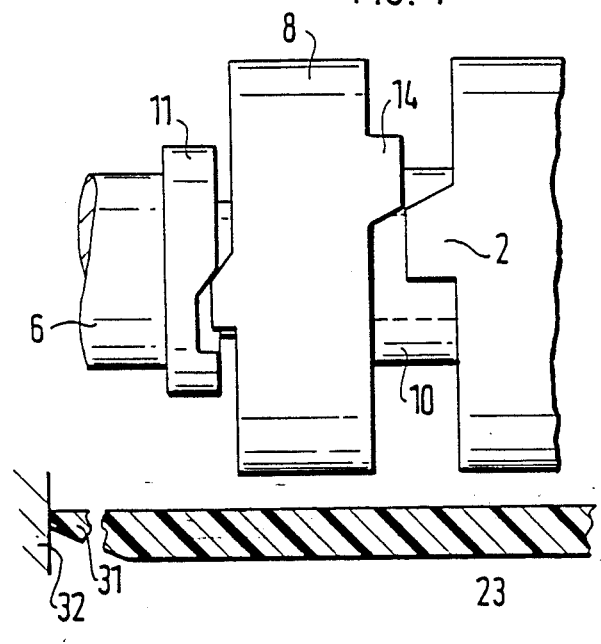
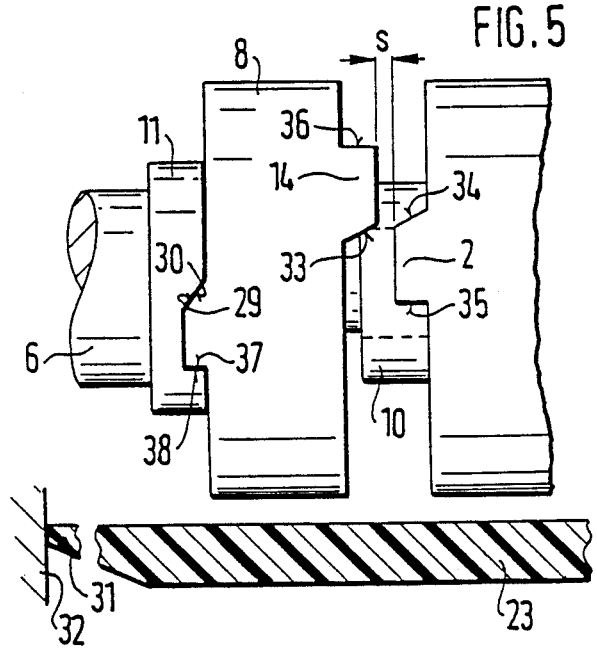

LOW-NOISE SCREWING TOOL COUPLING

BACKGROUND OF THE INVENTION

The invention is based on a motor-driven screwing tool. Such screwing tools normally comprise a coupling in the drive line. The coupling has the object of interrupting the flow of force between the motor drive and the screw when a determined torque is reached. A constructional type commonly used for such couplings comprises disks which are provided radially with teeth. The sloping sliding flanks of these teeth effect an axial force which is proportional to the load moment when driving in screws, causes the coupling disks to be spread apart and finally disengages the teeth when the limiting torque is reached, thus interrupting the flow of force. Since the tooth tips grind on one another after uncoupling, causing unwanted noise and wear, couplings are used which comprise three disks and two radial toothings arranged one after the other; one tooth pairing engages more deeply after the separation of the second, thus preventing the contact of the latter after the response of the coupling. However, this teaching, which is known from the DE-PS 4 37 803, has the disadvantage that the re-engagement of the cam pairing after uncoupling must be brought about by means of a separate lever. A simpler construction is the coupling according to the DE-OS 35 10 605 (=U.S. No. 4 655 103) which combines the aforementioned three-disk construction with a tooth, known from the DE-PS 25 26 004 (=U.S. No. 3 960 035), formed as a claw with a stop bevel. Another disadvantage is the fact that this coupling responds regardless of the rotational direction. However, it is precisely when loosening screws that the requirements for the flow of torque are different than when tightening, because a very high moment is required at the start when loosening screws particularly when a screw fits very tightly, e.g. as a result of corrosion; in the course of further loosening the screw, less and less torque is required. The opposite applies in the case of driving in screws; in particular, an interruption of the flow of force without rattling when the limiting torque is reached is desirable.

SUMMARY OF THE INVENTION

The motor driven screwing tool according to the invention comprising a housing provided with an annular front end part acting as a depth stop; a drive shaft supported for rotation in the housing in a fixed axial position; an output shaft supported for rotation in the housing and being axially displaceable between the annular front end part and the front end surface of the drive shaft; a screw bit attached to the front end surface of the output shaft and projecting through the annular front end part; a coupling including a first coupling element formed on an outer portion of the front end surface of the drive shaft, a second coupling element in the form of a coupling ring which is supported for rotation and axial displacement on the output shaft, and a third coupling element in the form of a shoulder on the output shaft; a spring arranged between a central portion of the front end surface of the drive shaft and the coupling ring to urge the same against the third coupling element; facing end surfaces of the coupling elements being provided with engageable cam-like coupling members each having a sloping cam surface and an axially directed stop surface; a second shoulder provided on the output shaft in the path of axial movement of the coupling ring at such a distance from the first mentioned shoulder that during rotation of the drive shaft in the screwing-in direction the sloping cam surfaces of the coupling ring slide on the sloping cam surfaces of the third coupling element until the coupling ring is displaced in axial direction into abutment against the second shoulder while during rotation in the reverse direction the coupling ring remains in engagement with the axially directed stop surfaces of the third coupling element.

The coupling, according to the invention, has the advantage that when loosening tight-fitting screws the full torque made available by the motor is transmitted to the screw without the necessity of effecting a readjustment or manual switching for this purpose. When driving in screws, the flow of force is interrupted after the limiting torque is reached with low noise and without wear. Moreover, only few individual parts are needed for the construction of the coupling; it is sturdy, simple to produce and assemble.

A particular advantage consists in that at the start of the screw driving process, the coupling disk, which is displaceable parallel to its axis of rotation, slides into the operational position on a sloping path which is defined by a fixed stop. This arrangement makes it possible to dispense with a special catch groove or interruption in the sloping path, which is subject to wear.

Exemplary embodiments of the invention are shown in the drawing and are explained in more detail in the following description.

BRIEF DESCRIPTION OF THE DRAWING

FIGS. 2 to 5 show in a side view principal coupling parts of the screwing tool of the invention in their various operational positions.

DESCRIPTION OF THE PREFERRED EMBODIMENTS

Figure 1:
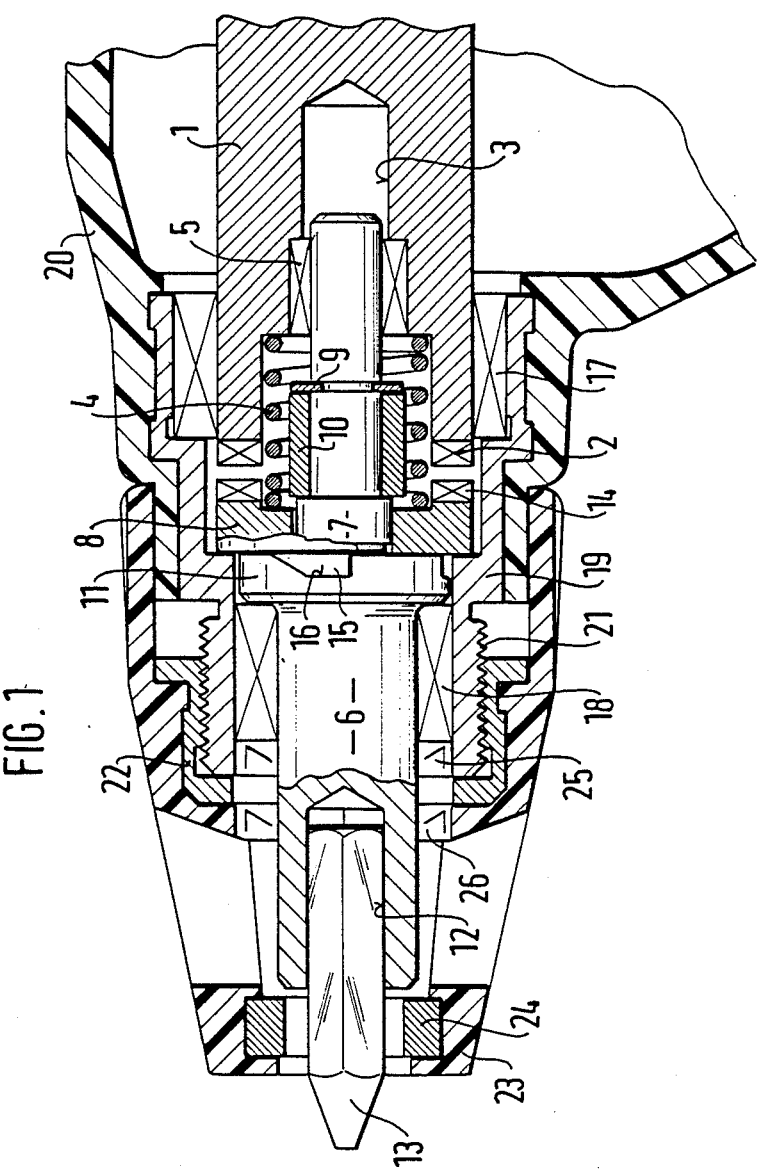
FIG. 1 is a sectional side view of an embodiment of the screwing tool of the invention.

The screwing tool, according to the invention, has a motor, not shown here, which drives a drive shaft 1 via a gear unit, which is also not illustrated. The drive shaft 1 comprises cam-like coupling members 2 provided in the outer area of its front end (that is, the end facing the workpiece) face. A bore hole 3 comprising three steps is formed in the central area of the front end face delimited by the coupling members 2. A spring 4 and a roller bearing 5 are arranged in the bore hole 3. The rear end of an output shaft 6, which is likewise stepped, is guided so as to be axially displaceable in the roller bearing 5. A coupling ring 8 is arranged on a shoulder 7 in the central area of the output shaft 6 so as to be rotatable and likewise axially displaceable.

The path of the coupling ring 8 is defined at the rear by a stop ring 10 which is slid onto an intermediate stepped portion of the output shaft 6 and fixed there against the shoulder 7 with a retaining clip arrangement 9. In the front, a shaft collar 11 defines the path of the coupling ring 8. The front end face of the output shaft 6 has a hexagonal pocket bore hole 12 for receiving a screw bit 13.

The coupling ring 8 is pressed against the shaft collar 11 by the spring 4. The rear end face of the coupling ring 8 is provided with cam-like coupling members 14 which cooperate with the coupling members 2 arranged on the drive shaft 1. The front end face of the coupling ring 8 carries three ramp-like projections 15 which correspond in shape with recesses 16 in the shaft collar 11. The front end portion of the drive shaft 1, as well as that of the output shaft 6, are guided in bearings 17 and 18, respectively, which are arranged in a guide sleeve 19. This guide sleeve 19 is securely connected with the housing 20 of the screwing tool, which housing 20 is made of plastic, for example. The front end area of the guide sleeve 19 is formed with an external thread 21, on which is screwed a threaded sleeve 22 with a corresponding internal thread. The threaded sleeve 22 is securely connected with a depth stop 23 having an embedded permanent-magnetic ring 24 which can be axially adjusted by means of rotating the depth stop 23 together with the threaded sleeve 22 around the external thread 21.

Two shaft seals 25 and 26 fit on the output shaft 6. One of them is arranged in the guide sleeve 19, the other is arranged in the depth stop 23.

Figure 2:
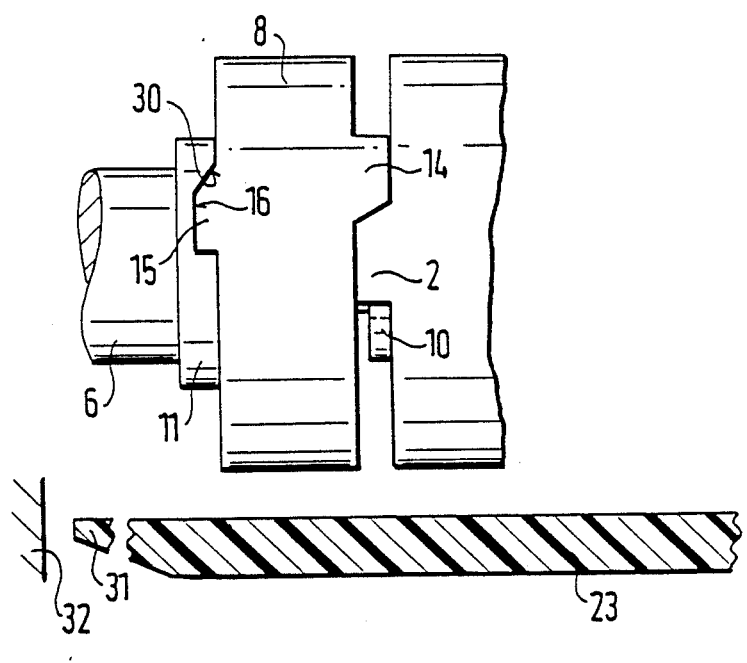

The manner of operation of the coupling, according to the invention, can be seen from the phases shown in FIGS. 2 to 5. The ramp-like projections 15 on the front end face of coupling ring 8 and the pairings of the cam-like coupling members 2, 14 are illustrated in a schematic manner in FIGS. 2 to 5 in various phases of a screw driving process. At the start of the screw driving process, the coupling members 2, 14 are engaged and the ramp-like projections 15 are completely sunk in the recesses 16, since the user presses the screwing tool in the screwing in direction against the resistance of the spring 4 after placing the screw bit 13 on the head of a non-illustrated screw which is to be screwed into the wall 32. The spring 4 is not shown in FIGS. 2 to 5. This position of coupling elements 1, 6 and 8 after the placement of the screw bit on the screw to be screwed in and prior to the switching on of the motor drive is shown in FIG. 2.

Figure 3:
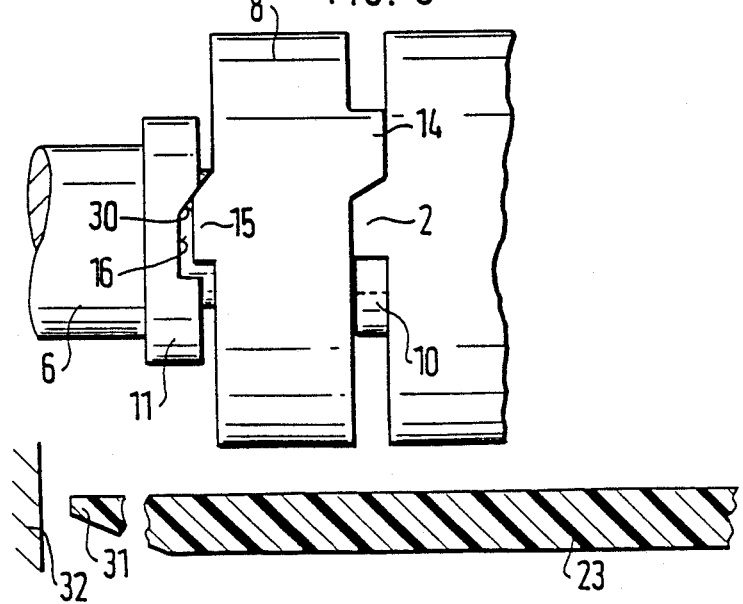

FIG. 3 shows the status after switching on the motor drive. As a result of the anti-torque moment of the screw (load moment), the coupling ring 8 slides on the sloping surface 30 of the recess 16 and moves toward the rear until it contacts the stop ring 10.

FIG. 4 shows how the increasing load moment during the driving in of the screw and the simultaneous placement of the annular front end 31 of the depth stop 23 on the wall 32 into which the screw is driven finally effect the spreading apart of the coupling members 2, 14 toward the end of the screwing process.

As soon as the front end 31 of the depth stop 23 contacts the wall 32, the force applied by the user in the forward feed direction is transmitted via the housing 20, instead of being transmitted via the drive shaft. The force of the spring 4 can accordingly cause the coupling members 2, 14 to disengage, whereby the coupling ring 8 in conjunction with its axial displacement along the sloping stop surfaces 33 and 34 executes a rotation opposed to the screwing-in rotational direction.

FIG. 5 shows the position of the coupling ring 8 in which by the action of the spring 4 it finally abuts at the shaft collar 11. A safety distance s accordingly arises which reliably prevents a contact between the coupling members 2, 14.

In order to loosen screws, the motor runs opposite the screw driving direction. In so doing, it is not the sloping can surface 33, 34 which abut at the coupling members 2 and 14, but the axially directed stop surfaces 35, 36, which are arranged perpendicular to the rear end face of the coupling ring 8. The ramp-like projections 15 on the front end face of the coupling ring 8, like the corresponding recesses 16 in the shaft collar 11, have perpendicular stop surfaces 37 and 38, respectively, on the side opposite the sloping stop surfaces 29, 30. The perpendicular stop surfaces 37 and 38 strike against one another during rotation opposite the normal or screwing in rotational direction. Consequently, there occurs no axial force which could disengage the coupling of elements 1, 6 and 8, for which reason the entire moment of the drive motor can constantly be transmitted in this reverse rotational direction.

Figure 6:
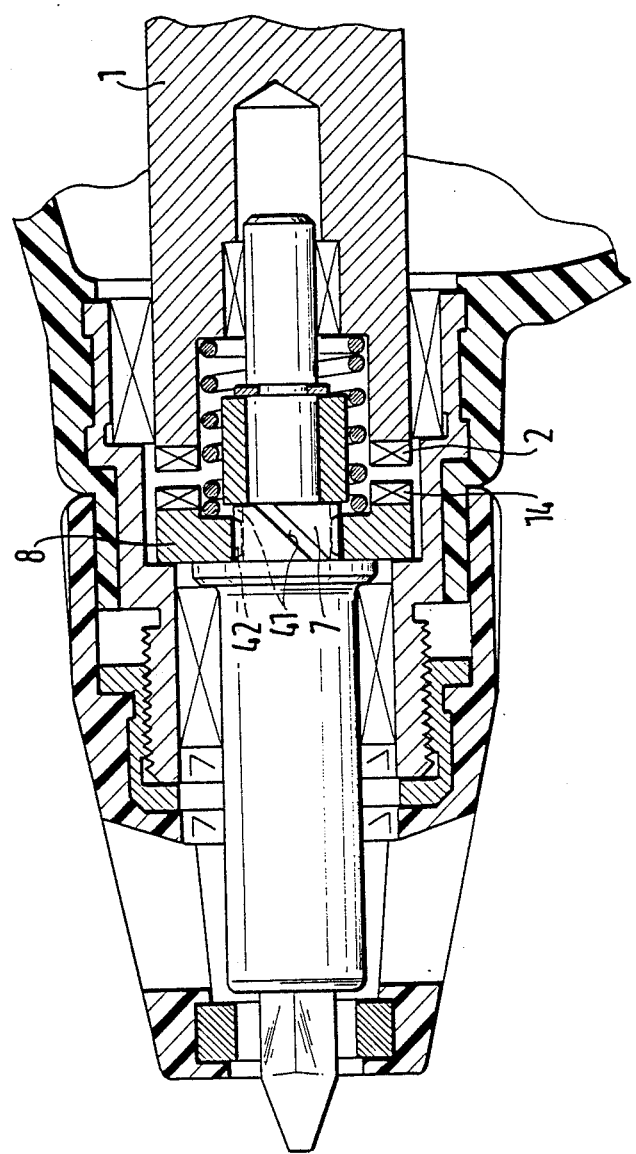
FIG. 6 shows a sectional side view of another embodiment of the invention.

The same effect is achieved with the construction variant shown in FIG. 6. The latter differs from that described above only in that, in this instance, the recesses 16 in the shaft collar 11 are replaced with sloping grooves 41 in the shoulder 7. Three of these sloping grooves 41 are uniformly distributed at the circumference of the shoulder 7 and are constructed as a guiding thread for the coupling 8. Assigned radial projections 42 at the inside of the coupling ring 8 engage in the sloping grooves 41. The slope of the sloping grooves 41 runs in such a way that when driving in screws an axially directed force component arises from the load moment occurring at that time, just as in the construction variant shown above, which axially directed force component presses the coupling ring 8 against the drive shaft 1, thus effecting the engagement of the coupling members 2 and 14. The principle of operation of this constructural variant does not differ from that described above.

I claim:

1. Motor driven screwing tool comprising a housing provided with an annular front end part acting as a depth stop; a drive shaft supported for rotation in said housing in a fixed axial position relative thereto; an output shaft supported for rotation in said housing and being axially displaceable between said annular front end part and a front end surface of said drive shaft; a screw bit attached to a front end surface of said output shaft and projecting through said annular front end part; a coupling including a first coupling element formed by an annular outer portion of said front end surface of the drive shaft, a second coupling element in the form of a coupling ring which is supported for rotation and axial displacement on said output shaft, and a third coupling element in the form of a first shoulder on said output shaft; cam-like coupling members provided on said first coupling element and on opposing end surfaces of said coupling ring, each of said coupling elements having a sloping cam surface and an axially directed stop surface; a spring arranged between a central portion of said first coupling element and said coupling ring to urge the same in axial direction against said third coupling element and to disengage coupling members of the coupling ring and of the first coupling element when said annular front end part is pressed against a support; a shoulder means provided on said output shaft between said first coupling element and said coupling ring at a distance from said third coupling element to limit the axial displacement of said coupling ring to the axial length of the sloping cam surface of the third coupling element whereby during rotation of the drive shaft in the screwing-in direction the sloping cam surfaces of the coupling ring slide on the sloping cam surfaces of the third coupling element until the coupling ring is displaced in an axial direction into abutment against said second shoulder while during rotation in the reverse direction the coupling ring remains in engagement with the axially directed stop surfaces of said third coupling element.

2. Motor driven screwing tool comprising a housing provided with an annular front end part acting as a depth stop; a drive shaft supported for rotation in said housing in a fixed axial position relative thereto; an output shaft supported for rotation in said housing and being axially displaceable between said annular front end part and a front end surface of said drive shaft; a screw bit attached to a front end surface of said output shaft and projecting through said annular front end part; a coupling including a first coupling element formed by an annular outer portion of said front end surface of the drive shaft, a second coupling element in the form of a coupling ring which is supported for rotation and axial displacement on said output shaft, and a third coupling element in the form of a first shoulder on said output shaft; cam-like coupling members provided on said first coupling element and on exposing end surface of said coupling ring opposite said first coupling element, each of said coupling elements having a sloping cam surface and an axially directed stop surface; a spring arranged between a central portion of said first coupling element and said coupling ring to urge the same in axial direction against said third coupling element and to disengage said coupling members when said annular front end part is pressed against a support; the sloping cam surface of said third coupling element forming at least one sloping groove directed toward said first coupling element and being engageable with said cam like coupling member of said coupling being formed as a projection on the inner wall of said coupling ring to act as a guiding thread for the coupling ring; a shoulder means provided on said output shaft between said first coupling element and said coupling ring at a distance from said third coupling element to stop the axial displacement of said coupling ring along said sloping groove when said coupling members are disengaged by said spring whereby during rotation of said drive shaft in the screwing-in direction said projection on the inner wall of said coupling ring slides in said sloping grooves until the coupling ring is displaced in an axial direction into abutment against said second shoulder while during rotation in the reverse direction the coupling ring remains in engagement with said third coupling element.

3. Screwing tool according to claim 1, characterized in that said first mentioned shoulder is constructed as a collar (11) which is formed on the output shaft (6).

4. Screwing tool according to claim 3, characterized in that said shoulder means is constructed as a stop ring (10) fastened on the output shaft (6).

5. Screwing tool according to claim 4, characterized in that the spring is constructed as a helical spring (4) whose internal diameter is greater than the external diameter of the stop ring (10).

6. Screwing tool according to claim 3, characterized in that the sloping surfaces arranged at the coupling ring (8) and at the output shaft (6) are constructed as ramp-like projections (15) on the end face of the coupling ring (8) opposite the collar, which ramp-like projections (15) cooperate with corresponding recesses (16) in the collar.

* * * * *